United States Patent [19]

Akerberg

[11] Patent Number: 4,478,269

[45] Date of Patent: Oct. 23, 1984

[54] FURAN RESIN COATED AGGREGATE

[75] Inventor: Denis W. Akerberg, Huntley, Ill.

[73] Assignee: QO Chemicals, Inc., Chicago, Ill.

[21] Appl. No.: 349,354

[22] Filed: Feb. 16, 1982

[51] Int. Cl.$^3$ .............................................. B22C 1/22
[52] U.S. Cl. .................................... 164/21; 164/526; 523/143; 523/144
[58] Field of Search ............... 523/143, 144; 164/526, 164/21

[56] References Cited

U.S. PATENT DOCUMENTS

| | | | |
|---|---|---|---|
| 4,051,301 | 9/1977 | Laitar | 428/404 |
| 4,073,343 | 2/1978 | Harnsberger | 166/295 |
| 4,090,995 | 5/1978 | Smillie | 523/146 |
| 4,120,842 | 10/1978 | Harnsberger | 523/131 |
| 4,336,342 | 6/1982 | Dunnavant | 523/144 |

*Primary Examiner*—Kuang Y. Lin

*Attorney, Agent, or Firm*—Neuman, Williams, Anderson & Olson

[57] ABSTRACT

A method and composition for forming a dry free-flowing particulate solid is disclosed which utilizes a novel binder system for bonding particles of carbon, sand and/or other solid aggregate materials. The solid, nonsticky binder system comprises furfural, a phenolic novolak resin, and a liquid amine having free hydrogens on the amine nitrogen which is capable of reacting with furfural. This system is capable of adhering to such particles while retaining the free-flowing characteristics of the particles. The method involves mixing the aggregate with the furfural-phenolic novolak resin until tacky, and adding methylene chloride to the tacky mix while continuing to mix. The mix is cooled by the rapid evaporation of the methylene chloride and quickly forms the free-flowing characteristics of a powder or granulated material.

10 Claims, No Drawings

FURAN RESIN COATED AGGREGATE

FIELD OF THE INVENTION

The present invention relates to furan modified phenolic resin coating for aggregates and more particularly, to a method of treating an aggregate with the furan modified phenolic resin for use in foundry applications and fluid permeable consolidated formation sand in connection with well bores.

The recovery of fluid such as gas and/or oil from underground formations is subject to plugging by sand particles which move or migrate to the well bore during recovery of the formation fluid where they block the passageway leading to the well bore. Such plugging or material impairment of the flow of the formation fluid distorts the bore hole and results in a loss or so decreases the flow of the fluid from the well as to cause the well to become economically unattractive, and therefore, would be shut down. In addition, the movement of the sand particles in the fluid can cause damage to the pipes and pumps being used to recover such fluid. In forcing the oil or gas to the well bore, steam can be pumped down an adjacent shaft or bore. The force of the steam erodes the sand formation beneath it, creating a hole or cavern where the steam may condense and lose its force.

In general, the shell process for forming metal castings and the like utilizes cores and/or molds made from a sand coated with a thermosetting resin. The core or mold is formed in a desired configuration from the resin coated sand about which a liquid metal is poured. The resin coating binding the core or mold together slowly burns out removing it from the system. The core subsequently collapses and can be easily disposed of. The resin binder of such a system has traditionally been a phenolic novolak resin cured with hexamethylenetetramine giving high tensile strength and very strong cores.

Accordingly, an object of the subject invention is a method for producing a resin coated sand composition having good physical strength and rapid curing through simple means.

Another object of the subject invention is an improved method of treating underground sand-containing formations to stabilize and/or build up the bore holes.

An additional object of the subject invention is a method for providing a coated foundry sand having improved shake-out and collapsibility characteristics for the use in shell molding.

These and other objects are accomplished through the unique process of the subject invention which involves coating a heated aggregate, such as sand or carbon, with a furan-modified novolak resin. The aggregate may be pre-catalyzed with an amine catalyst. Alternatively, the amine catalyst may be mixed with the resin which is blended onto the heated aggregate. Mixing of the resin-aggregate mixture is continued until a tacky, stiff mix results. At this point, sodium stearate and a nonflammable, non-toxic, low-boiling hydrocarbon or chlorinated hydrocarbon solvent, such as methylene chloride, is added to the batch and mixing is continued. The methylene chloride evaporates, cooling the batch and solidifying the resin, thereby turning the entire mixture into a free-flowing mix.

The resin coated aggregate prepared as the result of the above process is ideally suited for use in the shell molding process to produce cores and molds having significantly improved shake-out collapsibility characteristics. In addition, the resin coated aggregate also may be pumped down well bores, thereby forcing it into an unconsolidated formation adjacent to or in reasonable proximity to a well bore. When the coated aggregate is suitably placed in the formation, the well is shut down for the minimal time required to effect curing of the resin by the amine catalyst under the elevated temperature of the formation. After curing, a fluid permeable consolidated sand formation is the result for either decreasing the movement of sand particles into the well bore, or shoving up the sand formation about the well bore, as desired.

DESCRIPTION OF A PREFERRED EMPBODIMENT

In a preferred embodiment of the subject invention, a phenolic novolak resin is mixed with furfural to achieve a coating resin with the desired properties. Generally speaking, as used herein, the term "novolak" and "novolak resin" denote a condensation product such as is obtained by causing a phenol to condense with less than an equi-molar portion of an aldehyde or ketone, in an acidic environment. Structurally, the molecules of a novolak consist essentially of alkyl substituted or unsubstituted phenyl nuclei connected together by methylene or substituted methylene links.

To form a preferred novolak suitable for use in the subject invention, a mixture of phenol and aqueous formaldehyde is prepared at a ratio of 1.15 moles phenol to 1.00 moles of formaldehyde. A sufficient quantity of oxalic acid is admixed therewith to provide a pH of about 1.0 and the reaction mixture is allowed to react under atmosphere reflux temperature conditions until all of the formaldehyde disappears. Thereafter, a sufficient quantity of aqueous sodium hydroxide is added to the reaction mixture to elevate the pH of the reaction mixture to the pH desired. The refluxing condensor is then removed and most of the water and unreacted phenol is allowed to be removed from the reaction mixture in the conventional reduced pressure distillation stripping step. The resulting resin is a solid at room temperature. While reference is made herein to a specific manner of preparing a solid novolak, other methods as are well known and accepted in the art may be utilized.

To the novolak prepared as indicated above, furfural is added in sufficient quantities to achieve a desired viscosity. The furfural may be either added to the novolak while still in melted condition in the novolak reactor or solid novolak may be added and dissolved in the furfural. The following table indicates approximate amounts of furfural as percentages of the whole mixture which may be added to the novolak to obtain a given viscosity.

TABLE I

| Percent Furfural | Viscosity (CPS) |
|---|---|
| 44% | 3000 |
| 48% | 900 |
| 50% | 300 |
| 53% | 250 |
| 58% | 180 |
| 70% | 65 |

The furfural novolak solution thus prepared has a long shelf life at room temperature and though liquid and completely adjustable viscosity through the addition of furfural, is completely reactive, all components becoming a part of the solids of the cured resin. However, inclusion of a reactive amine with this solution, in accordance with the present invention, converts it to an uncured but solid, non-sticky condition. The resulting solid is thermoplastic. However, because the amine can convert the system into a thermoset condition, the amine-containing admixture is a catalyzed binder system when disbursed on a particulate solid in accordance with the present invention.

Although the particulate solids coated in accordance with this invention contain the amines, they are essentially uncured and are capable of becoming plastic or semi-liquid on heating. This allows the particulate solids to be shaped or handled as desired. When the furfural is added to the novolak in an amount more than double that of the novolak by weight, the excess would appear to be wasteful. The minimum amount of furfural to be added to the novolak is that which is sufficient to liquify the novolak. Furfural to novolak ratios of 0.6:1.0–2.0:1.0 are preferred. The amine catalysts of the subject invention are preferrably liquid mono- or polyamines having two or more free hydrogens on the amine nitrogen and a boiling point over 150° C. However, lower boiling amines such as ammonia or ethylene diamine may be used. The most preferred amine is triethylenetetramine. In addition, hexamethylenetetramine may be added for use as a quick-setting catalyst when the coated sand is molded. However, the use of the hexamethylenetetramine has no bearing or function in the actual coating procedure.

As has become common practice in the foundry art and other industry utilizing coated aggregate compositions, the coated aggregates employed in the practice of the subject invention are preferably formulated to contain a release agent for facilitating removal of cores and molds formed from the coated aggregate of the subject invention. Such release agents also improve densities and increase tensile strengths. The coated aggregate compositions of the subject invention can be used with or without such release agents. Representative release agents include metal stearates such as calcium stearates, sodium stearates, zinc stearates, and the like; fatty amides such as the bistearoylamide of ethylene diamine; silicones and other art recognized release agents. Such release agents may be added to the mixture during the sand coating process or may be dissolved or disbursed in the resin prior to coating the resin on the sand. Other additives may also be included as known in the art for increasing strength and improving cure rate as desired.

When forming a sand aggregate, any of a variety of conventional foundry sands may be employed in the practice of the subject invention. Such sands include silica sand, lake sand, bank sand, zircon sand, olivine sand, chromite sand, zircore sand, aluminum silicate sand, etc., as well as combinations thereof. Other materials may be employed in the subject invention, including silicon carbide, graphite, magnesite, and dolomite.

The invention is further illustrated by the following examples which, however, are not to be taken as luminating in any respect. All parts and percentages, unless expressly stated to be otherwise, are by weight.

EXAMPLE I

| Ingredients | Amount |
|---|---|
| Silica Sand | 1000 gms |

-continued

| Ingredients | Amount |
|---|---|
| Furfural-Phenolic Novolak Resin (300 CPS) | 50 gms |
| Hexamethylenetetramine | 5 gms |
| Triethylenetetramine | 5 gms |
| Methylene Chloride | 25 gms |
| Sodium Stearate | 1 gm |

The hexamethylenetetramine was added to the hot (225° F.) sand and mixed well. The resin and triethylenetetramine are added to the catalyzed sand and mixed in a sigma blade mixer until stiff and tacky, at which point the methylene chloride and stearate are added. Mixing is continued for a minute or two until a free flowing coated sand results. Biscuits made from such a resin coated sand have good scratch hardness and tensile strength.

EXAMPLE II

| Ingredients | Amount |
|---|---|
| Gravel Pack Sand (+20, −40 mesh) | 1000 gms |
| Furfural-Phenolic Novolak Resin (300 CPS) | 50 gms |
| Triethylenetetramine | 5 gms |
| Hexamethylenetetramine | 5 gms |
| Sodium Stearate | 1 gm |
| Water | 10 gms |

The above mixture was prepared by adding the pre-catalyzed resin to the hot sand (225° F.) and then adding the stearate, hexamethylenetetramine, and water solution to the mix. The mix did break down, but reclumped and had to be broken down by hand. Tensile strength specimens were prepared and were significantly weaker than those prepared from the procedure and formulation of Example I.

EXAMPLE III

| Ingredients | Amounts |
|---|---|
| Carbon (high purity, passes through 100 mesh screen) | 600 gms |
| Furfural-Phenolic Novolak Resin (300 CPS) | 90 gms |
| Triethylenetetramine | 9 gms |
| Hexamethylenetetramine | 9 gms |
| Sodium Stearate | 1 gm |
| Methylene Chloride | 40 gms |

The carbon was heated to 225° F. and the hexamethylenetetramine was added to the mixture. The furfural-phenolic novolak resin was mixed with the Triethylenetetramine and added to the carbon while continuously mixing. When the vapors were no longer exuding from the mix (the mix being still free-flowing), the stearate and methylene chloride were added. When the mix began to ball and slow the mixer, more methylene chloride was added causing the mixture to further break down the remaining clumps. When the mixture was further broken down by screening, a nice free-flowing carbon resulted.

EXAMPLE IV

The procedure and formulation of Example III were repeated, but the carbon-resin mixure was allowed to mix longer. After four minutes, the mix balled, at which time 12 gms. of methylene chloride was added. The mix immediately broke down to a free-flowing powder which upon standing had a tendency to bridge, but could be easily broken up. Tensile specimens were prepared from the formulations of both Examples III and IV, being pressed at 300° F. for three minutes at 9000 psi. Such biscuits were strong with a good scratch hardness.

EXAMPLE V

Three 1000 gram sand mixes were prepared from the following formulations:

| Ingredients | Mix #1 | Mix #2 | Mix #3 |
|---|---|---|---|
| Gravel Pack Sand (+20, −40 mesh) | 1000 gms | 1000 gms | 1000 gms |
| Furfural-Phenolic Novolak Resin (300 CPS) | 50 gms | 50 gms | 50 gms |
| Triethylenetetramine | 5 gms | 5 gms | 5 gms |
| Hexamethylenetetramine | 5 gms | 5 gms | 5 gms |
| Sodium Stearate | 1 gm | 1 gm | 1 gm |
| Methylene Chloride | 20 gms | 40 gms | 40 gms |

Mix #1—Sand was heated to 225° F. and hexamethylenetetramine was mixed therein for approximately ten seconds. The triethylenetetramine was added at this point and mixed for five senconds. The furfural-phenolic novolak resin was added and mixed until an extremely sticky, tacky mix resulted nearly stopping the mixer. The stearate and methylene chloride were added at this point and the mix broke down, but reclumped. The mix was transferred to a cool mixing bowl and agitated or stirred into a free-flowing mixture.

Mix #2—The procedure with this formulation is identical to that of Mix #1 with the exception that the triethylenetetramine was allowed to mix for fifteen seconds prior to the addition of the furfural-phenolic novolak resin. In addition, 20 more grams of methylene chloride were added to increase the cooling capability of the mix. The mix became much lighter in color than Mix #1, but did appear to break down better and did not have to be transferred to another bowl for further break down.

Mix #3—With this formulation, the procedure was identical to that of Mix #1 with the exception that the resin furfural-phenolic novolak resin was added immediately after the addition of the triethylenetetramine. In addition, 40 grams of methylene chloride was added rather than 20. The mix broke down immediately.

Tensile biscuits were formed from each of the screened mixes (14 mesh). Each such tensile biscuit formed was strong with good scratch resistance.

EXAMPLE VI

The following formulation was used throughout this entire example.

| Ingredients | Amounts |
|---|---|
| Gravel Pack Silica (+20, −40 mesh) | 1000 gms |
| Furfural-Phenolic Novolak Resin (300 CPS) | 50 gms |
| Hexamethylenetetramine | 5 gms |
| Triethylenetetramine | 5 gms |
| Calcium Stearate | 1 gm |
| Methylene Chloride | 40 gms |

The following mixing procedure was used for each mix produced. The sand was placed in a kitchen-type mixing bowl and preheated to the mix temperature indicated. Upon reaching the temperature, the bowl was attached to the mixer and the sand agitated with a paddle-type blade. The hexamethylenetetramine was then added and mixed for five seconds followed by the triethylenetetramine for another five seconds. The furfural-phenolic novolak resin was added at this point and allowed to mix until it became so tacky as to threaten to stop the mixer. The amount of time varied, but usually took from 1 to 3 minutes. At this point, the methylene chloride and calcium stearate mixture was added to the mix which then broke down and became free-flowing. The amount of time necessary to reach this point varied between 5 to 10 minutes depending on the temperature. The following are the relevant observations concerning each mixing preparation:

(1) Ambient mix temperature—The mix became very tacky, but did not dry out when the methylene chloride was added, the coated sand broke down initially, but reclumped to a tacky mix. The mix was allowed to sit overnight and then broken up and screened through a #14 screen. A tendency to clump was still observed.

(2) 200° F. mix temperature—On the addition of methylene chloride to the mix, it broke down with the exception of some which stuck to the side of the bowl. After screening the mix still had a slight tendency to clump, but was easily shaken apart.

(3) 225° F. mix temperature—Very similar to Mix #2, but did not exhibit the clumping tendency after screening.

(4) 250° F. mix temperature—Mixed very well—no problems encountered.

(5) 275° F. mix temperature—No problems encountered.

(6) 300° F. mix temperature—No problems encountered.

Tensile biscuits were blown from each as in shell molding using a foundry hot-box until under the following conditions:
Blow time—0.5 seconds
Temperature—350° F.
Cure time—5 minutes All samples were tested for tensile and scratch hardness one hour after cure with the following results:

TABLE II

| MIX TEMP | SCRATCH | TENSIL (psi) #1 | #2 | #3 | AVERAGE |
|---|---|---|---|---|---|
| AMBIENT | 72–78 | 185 | 220 | 195 | 200 |
| 200° F. | 80–84 | 265 | 265 | 255 | 258 |
| 225° F. | 75–80 | 185 | 200 | 200 | 195 |
| 250° F. | 80–82 | 275 | 265 | 240 | 260 |
| 275° F. | 80–84 | 285 | 240 | 260 | 262 |
| 300° F. | 80–84 | 205 | 215 | — | 210 |

Thus, it is apparent that there has been provided, in accordance with the invention, a process and product that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method for forming a free-flowing, thermosettable composition comprising the steps of:
   a. heating a solid particulate material to a temperature of 300° F. or less;
   b. admixing phenolic novolak resin with furfural to yield a liquid furfural-phenolic novolak resin blend;
   c. mixing the liquid furfural-phenolic novolak resin blend and an amine catalyst onto the heated solid particulate material;
   d. allowing the liquid furfural-phenolic novolak resin blend on the solid particulate material to react in the presence of the amine catalyst for 1 to 3 minutes to form a reacted mixture;
   e. adding a low-boiling hydrocarbon solvent to the reacted mixture; and,
   f. continuing mixing until the reacted mixture becomes a theromsettable, free-flowing solid particulate material, said free-flowing solid material being flowable, non-sticky, and thermosettable upon application of heat.

2. The method of claim 1 wherein said amine is a liquid aliphatic amine having free hydrogens on the amine notrogen and a boiling point of 150° C.

3. The method of claim 1 wherein said amine is selected from the group consisting of triethylenetetramine, ammonia, hexamethylenetetramine and ethylene diamine.

4. The method of claim 1 wherein said solid particulate material is selected from the group of sand, carbon, graphite, silicon carbide, magnesite, and dolomite.

5. The method of claim 1 wherein hexamethylenetetramine is added to the hot particulate material and blended prior to the mixing of the liquid furfural-phenolic novalak resin system on the particulate material.

6. The method of claim 1 wherein a surplus quantity of said free-flowing particulate solid is placed against a heated mold pattern for a sufficient time to produce a shell mold of desired thickness.

7. The method of claim 1 wherein the solid particulate material is heated to a temperature in the range 200° F. to 300° F.

8. The method claim 1 wherein the ratio of furfural to novalak is in the range 0.6:1.0 to 2.0:1.0.

9. A furfural-phenolic novolak resin coated aggregate comprising an aggregate coated with a resin system prepared by:
   (1) blending furfural with a phenolic novolak to form a liquid furfural-phenolic novolak resin system;
   (2) blending an aggregate with an amine catalyst;
   (3) heating the catalyst-aggregate mix to a temperature of 300° F. or less;
   (4) blending the heated catalyst-aggregate mix with said liquid furfural-phenolic novalak resin system to form a resin coated aggregate mixture;
   (5) allowing said mixture to be agitated for a time period of 1 to 3 minutes, inclusive;
   (6) adding methylene chloride to the agitated mixture; and
   (7) continuing agitating until a free-flowing thermosettable composition develops.

10. The method of claim 7 wherein the free-flowing thermosettable composition is pumped down a well bore; forced into an unconsolidated formation adjacent to the well bore; and then heated to thermoset the composition solid in the well bore thereby forming a consolidated sand formation on the interior of the well bore.

* * * * *

UNITED STATES PATENT AND TRADEMARK OFFICE
CERTIFICATE OF CORRECTION

PATENT NO. : 4,478,269

DATED : October 23, 1984

INVENTOR(S) : Denis W. Akerberg

It is certified that error appears in the above-identified patent and that said Letters Patent is hereby corrected as shown below:

Column 6, line 41, "until" should be -- unit --

Column 8, line 29, "claim 7" should be -- claim 9 --

Signed and Sealed this

Sixteenth Day of April 1985

[SEAL]

Attest:

DONALD J. QUIGG

Attesting Officer

Acting Commissioner of Patents and Trademarks